US007664576B2

(12) United States Patent
Ichinose et al.

(10) Patent No.: US 7,664,576 B2
(45) Date of Patent: Feb. 16, 2010

(54) APPARATUS AND METHOD FOR ASSEMBLING TIRE AND WHEEL BASED ON RIGIDITY AND RADIAL RUNOUT OF WHEEL

(75) Inventors: Hidemi Ichinose, Mie (JP); Mikio Kashiwai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 430 days.

(21) Appl. No.: 11/661,829

(22) PCT Filed: Aug. 26, 2005

(86) PCT No.: PCT/JP2005/015501

§ 371 (c)(1),
(2), (4) Date: Mar. 5, 2007

(87) PCT Pub. No.: WO2006/027960

PCT Pub. Date: Mar. 16, 2006

(65) Prior Publication Data

US 2007/0250196 A1     Oct. 25, 2007

(30) Foreign Application Priority Data

Sep. 6, 2004    (JP)   ............................. 2004-258515

(51) Int. Cl.
*G01M 1/00* (2006.01)
(52) U.S. Cl. ................. 700/279; 301/5.21; 29/802; 73/459
(58) Field of Classification Search ................ 700/279; 301/5.21, 5.22; 29/407.1, 802; 73/459, 468
See application file for complete search history.

(56) References Cited

U.S. PATENT DOCUMENTS

| 6,579,389 | B1 * | 6/2003 | Kobayashi | 156/64 |
| 6,668,213 | B2 * | 12/2003 | Takahashi | 700/279 |
| 6,736,007 | B2 | 5/2004 | Watanabe et al. | |
| 6,889,549 | B2 * | 5/2005 | Kobayashi | 73/459 |
| 2002/0163245 | A1 | 11/2002 | Watanabe et al. | |

FOREIGN PATENT DOCUMENTS

| EP | 1 243 444 A1 | 9/2002 |
| JP | 2000-19050 A | 1/2000 |
| JP | 2000-171323 A | 6/2000 |
| JP | 2000-296707 A | 10/2000 |
| JP | 2002-137770 A | 5/2002 |
| JP | 2002-187401 A | 7/2002 |
| JP | 2002-234316 A | 8/2002 |
| JP | 2004-268662 A | 9/2004 |

* cited by examiner

*Primary Examiner*—Ryan A Jarrett
(74) *Attorney, Agent, or Firm*—Birch, Stewart, Kolasch & Birch, LLP

(57) ABSTRACT

Based upon rigidity classifications of wheels and radial runout classifications of the wheels, the lower the rigidity classification or the lower the radial runout classification, the more likely a methodology (heavy point-light point alignment) is selected in which a light point of static imbalance of the tire and a heavy point of static imbalance of the wheel are aligned with each other, than another methodology (radial force variation alignment) in which a peak position of a primary component of radial force variation of the tire and a bottom position of a primary component of radial runout of the wheel are aligned with each other, so as to assemble a tire and a wheel together.

20 Claims, 6 Drawing Sheets

FIG.3

| RIGIDITY CLASSIFICATION OF WHEEL / RADIAL RUNOUT CLASSIFICATION OF WHEEL | HIGH RIGIDITY | | MIDDLE RIGIDITY | LOW RIGIDITY |
|---|---|---|---|---|
| | ALUMINUM WHEEL | IRON WHEEL RIM THICKNESS: 3.2mm, 3.5mm | IRON WHEEL RIM THICKNESS: 2.9mm | IRON WHEEL RIM THICKNESS: 2.3mm, 2.6mm |
| 0~0.15 mm | HEAVY POINT-LIGHT POINT ALIGNMENT | HEAVY POINT-LIGHT POINT ALIGNMENT | HEAVY POINT-LIGHT POINT ALIGNMENT | HEAVY POINT-LIGHT POINT ALIGNMENT |
| 0.16~0.38 mm | RADIAL FORCE VARIATION ALIGNMENT | RADIAL FORCE VARIATION ALIGNMENT | HEAVY POINT-LIGHT POINT ALIGNMENT | HEAVY POINT-LIGHT POINT ALIGNMENT |
| 0.39~0.5 mm | — | RADIAL FORCE VARIATION ALIGNMENT | RADIAL FORCE VARIATION ALIGNMENT | HEAVY POINT-LIGHT POINT ALIGNMENT |

FIG.5
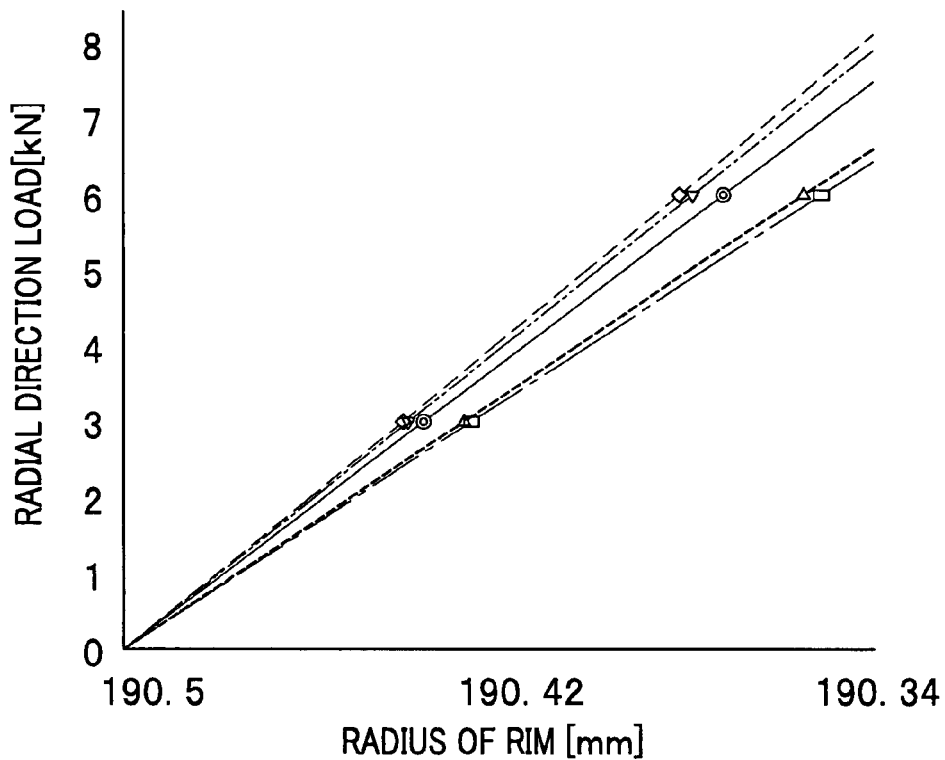
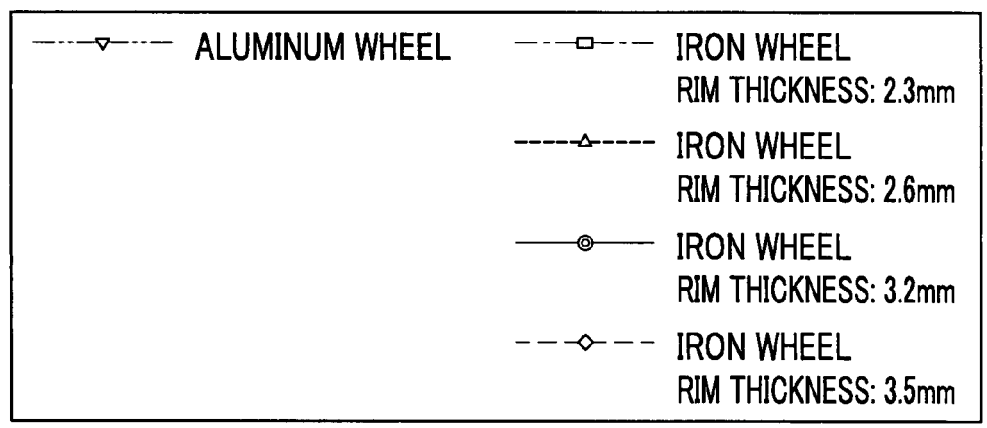

FIG.6
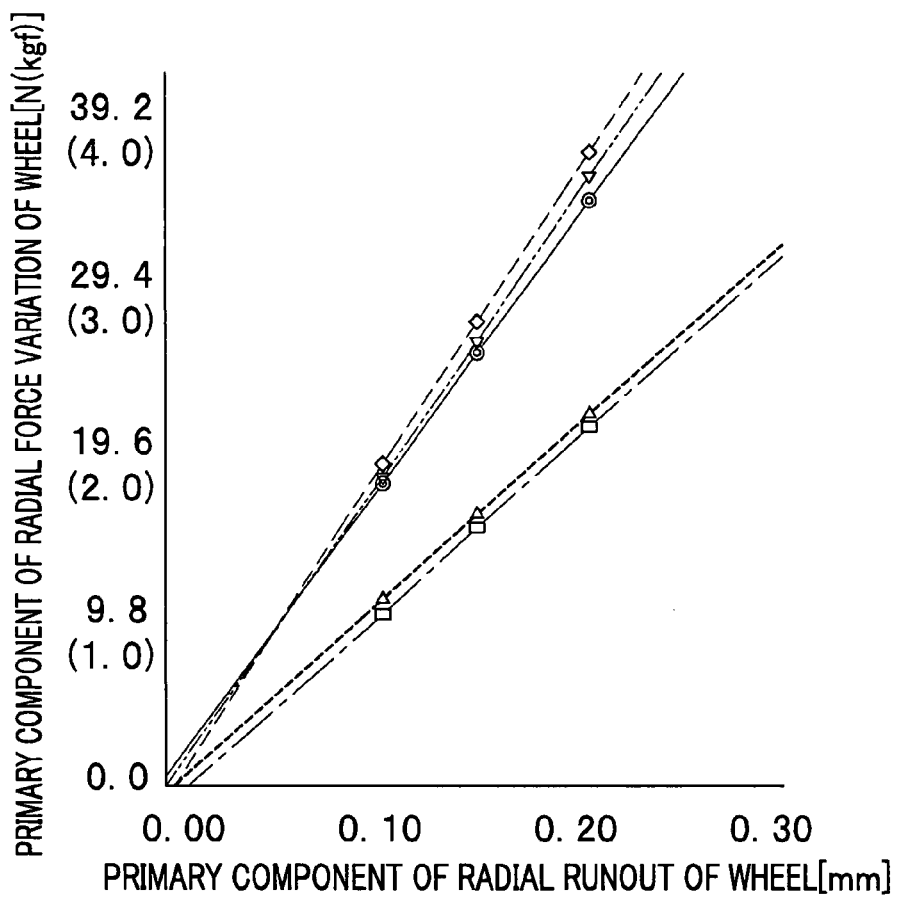
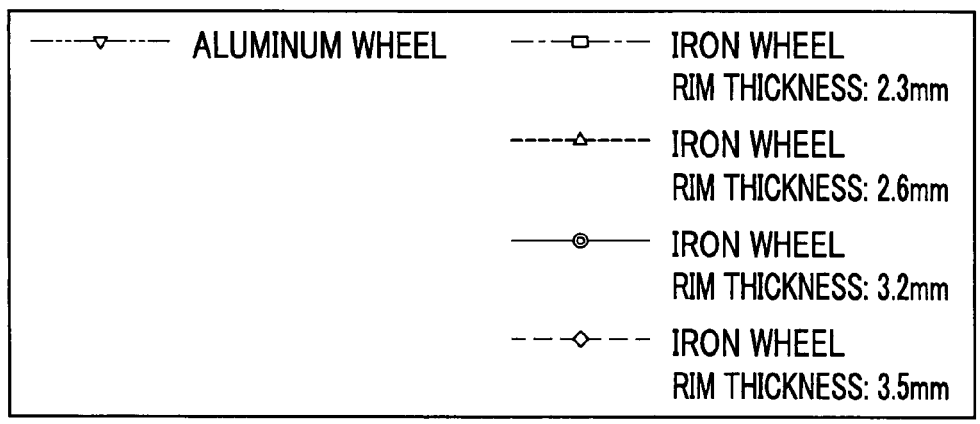

APPARATUS AND METHOD FOR ASSEMBLING TIRE AND WHEEL BASED ON RIGIDITY AND RADIAL RUNOUT OF WHEEL

TECHNICAL FIELD

This invention relates to an apparatus and a method for assembling a tire and a wheel together, and particularly to an apparatus and a method for assembling a tire and a wheel together, in which a methodology of assembling a tire and a wheel is selected on the basis of a material of the wheel, a thickness of a rim and an amount of radial runout of the wheel.

BACKGROUND ART

Typically, the wheel for automobiles or other vehicles is provided as an assembly of a tire and a wheel. The tire and the wheel each have a manufacturing tolerance within which the material, shape or other properties thereof may be subject to variation during a manufacturing process. For this reason, each of the tire and the wheel has a circumferentially uneven weight distribution shown in its static state (hereinafter referred to as "static imbalance"), and a circumferentially uneven weight distribution caused by its rotational motion (hereinafter referred to as "dynamic imbalance").

Further, the tire is subject to variation in the force applied thereto in the radial directions when the tire is given a turn (hereinafter referred to as "radial force variation"). On the other hand, the wheel is subject to variation in the runout in the radial directions when the wheel is given a turn (hereinafter referred to as "radial runout").

The static imbalance and other properties as described above may cause vibration or shimmy of a vehicle body and a jerking motion of the steering wheel while the vehicle is running. Therefore, the static imbalance and the dynamic imbalance which each of the tire and the wheel should be corrected. Moreover, the radial force variation of the tire may preferably be cancelled out by the radial runout of the wheel.

As a method for correcting the static imbalance and the dynamic imbalance, a methodology of aligning a light point of the static imbalance, which is the lightest point in circumferential positions of the tire in the static state, and a heavy point of the static imbalance, which is the heaviest point in circumferential positions of the wheel in the static state, with each other is known in the art.

As a method for canceling out the radial force variation of the tire by the radial runout of the wheel, a methodology of aligning a peak position of a primary component of the high-speed radial force variation of the tire, as exhibited when the tire is being turned at high speed, and a bottom position of a primary component of the radial runout of the wheel with each other has been disclosed (see, for example, JP2002-234316 A).

Furthermore, another methodology has been disclosed (see, for example, JP2000-296707 A) in which a phase difference between the radial force variation and the dynamic imbalance of the tire and a phase difference between the radial runout and the dynamic imbalance of the wheel are determined to assemble together the tire and the wheel having the phase differences close to each other.

However, in the tire/wheel assembling methodology of aligning the light point of the static imbalance of the tire and the heavy point of the static imbalance of the wheel with each other, the radial force variation of the tire and the radial runout of the wheel cannot be resolved. Meanwhile, the radial force variation of the tire and the radial runout of the wheel, unlike the case with unevenness of weight distribution, cannot be resolved after the tire and the wheel are assembled together.

In the tire/wheel assembling methodology of aligning the peak position of a primary component of the high-speed radial force variation of the tire and the bottom position of a primary component of the radial runout of the wheel with each other, the static imbalance and the dynamic imbalance cannot be resolved. As a result, an adjustment weight used to correct the unevenness of the weight distribution would be bigger than that used in the methodology of aligning the light point of the static imbalance of the tire and the heavy point of the static imbalance of the wheel with each other to reduce the unevenness of the weight distribution in advance. Such a bigger adjustment weight would impair the appearance, and go counter to the weight reduction, as well as the cost reduction, of the tire/wheel assembly.

In the tire/wheel assembling methodology of determining a phase difference between the radial force variation and the dynamic imbalance of the tire and a phase difference between the radial runout and the dynamic imbalance of the wheel to assemble together the tire and the wheel having the phase differences close to each other, preliminary steps may be required for measuring and determining the dynamic imbalance and other properties of a plurality of tires and wheels. For that reason, a storage facility for temporarily storing the tires and wheels for which measurements have been carried out would be necessitated. Moreover, in this assembling methodology, a conveyance facility for conveying the temporarily stored tires and wheels to an assembling stage would also be necessitated. Further, in this assembling methodology, the assembling process would be more complicate in comparison with the other tire/wheel assembling methodologies in that this methodology involves the following and other steps of: temporarily storing the tire and the wheel, selecting the combination thereof, and conveying them to the assembling stage, which would disadvantageously prolong the operation time.

Under the circumstances, the method which generally prevails comprises assembling a tire and a wheel in such a manner that the radial force variation of the tire is cancelled out by the radial runout of the wheel, and after assembling the tire and the wheel, correcting the static imbalance and the dynamic imbalance which the tire/wheel assembly has by adding an adjustment weight. Accordingly, the disadvantage of a bigger adjustment weight necessitated still remains unattended.

It would be desired to eliminate the disadvantage of such a bigger adjustment weight impairing the appearance of the tire/wheel assembly, and thus to provide an apparatus and method for assembling a tire and a wheel together, in which an adjustment weight can be minimized so as to improve the appearance, using a simple facility and process.

DISCLOSURE OF INVENTION

In one aspect of the present invention, an apparatus for assembling a tire and a wheel together comprises: a first input unit configured to receive rigidity information of the wheel on which the tire is to be mounted; a second input unit configured to receive an amount of radial runout of the wheel on which the tire is to be mounted; a selection unit including a table stored in advance, wherein the table as a set of data comprises classifications which include a plurality of rigidity classifications for classifying the wheel by rigidity based upon the rigidity information and a plurality of radial runout classifications for classifying the wheel by the amount of radial runout, each of the classifications being associated with one of tire/wheel assembling methodologies which include a first methodology and a second methodology, the first methodology being a methodology in which a light point of static imbalance of the tire and a heavy point of static imbalance of the wheel are aligned with each other, the second methodology being a methodology in which a peak position of a primary component of radial force variation of the tire and a bottom position of a primary component of radial runout of the wheel are aligned with each other, wherein the selection unit is configured to select a tire/wheel assembling methodology retrieved from the table based upon the rigidity information of the wheel received by the first input unit and the amount of radial runout of the wheel received by the second input unit; and an output unit configured to output the assembling methodology selected by the selection unit, wherein the tire and the wheel are assembled together in accordance with the output assembling methodology.

According to the above-recited apparatus, the methodology for assembling a tire and a wheel together in a properly balance-adjustable manner can be selected by making use of the rigidity information and the amount of radial runout of the wheel on which the tire is to be mounted, and thus an apparatus for assembling a tire and a wheel can be implemented in a simple device configuration without requiring a bigger adjustment weight. Further, addition of some devices such as an input unit to an existing apparatus for assembling a tire and a wheel is all that is needed to provide an improved apparatus for assembling a tire and a wheel as described above; therefore, the existing equipment can be utilized effectively and the capital investment can be reduced.

In the above apparatus for assembling a tire and a wheel, the selection unit for selecting the tire/wheel assembling methodology may be configured such that the lower the rigidity classification is, the more likely the first methodology is selected by the selection unit. Alternatively or additionally, the selection unit for selecting the tire/wheel assembling methodology may be configured such that the lower the radial runout classification is, the more likely the first methodology is selected by the selection unit.

With this configuration, the first methodology, in which a light point of static imbalance of the tire and a heavy point of static imbalance of the wheel are aligned with each other, is given a priority, upon selection, higher than that which is given to the second methodology in which a peak position of a primary component of radial force variation of the tire and a bottom position of a primary component of radial runout of the wheel are aligned with each other; therefore, excessive increase in the size of a adjustment weight for correcting unevenness of weight distribution can be avoided.

The rigidity information of the wheel may include a thickness of a rim of the wheel or a material of the wheel, for example. The both of the thickness and the material of the wheel can be utilized as the rigidity information. Since the rigidity information of the wheel is such information, e.g., the thickness of the rim and/or material of the wheel, as can be readily measured or acquired, the apparatus for assembling a tire and a wheel can be implemented in a simple device configuration.

In another aspect of the present invention, a method for assembling a tire and a wheel is provided. The method for assembling a tire and a wheel comprises the steps of: selecting one of a first methodology and a second methodology among tire/wheel assembling methodologies on the basis of rigidity information of the wheel and an amount of radial runout of the wheel, the first methodology being a methodology in which a light point of static imbalance of the tire and a heavy point of static imbalance of the wheel are aligned with each other, the second methodology being a methodology in which a peak position of a primary component of radial force variation of the tire and a bottom position of a primary component of radial runout of the wheel are aligned with each other; and assembling the tire and the wheel together in accordance with the selected assembling methodology.

According to the method as described above, the methodology for assembling a tire and a wheel together in a properly balance-adjustable manner can be selected by making use of the rigidity information and the amount of radial runout of the wheel on which the tire is to be mounted, and thus the method for assembling a tire and a wheel can be executed in a simple process configuration without requiring a bigger adjustment weight.

In the method for assembling a tire and a wheel as described above, the selecting step may be configured to comprise selecting the first methodology in an increased likelihood as the rigidity of the wheel determined on the basis of the rigidity information of the wheel is lower. Alternatively or additionally, the selecting step may be configured to comprise selecting the first methodology in an increased likelihood as the amount of radial runout is smaller.

With this configuration, the first methodology, in which a light point of static imbalance of the tire and a heavy point of static imbalance of the wheel are aligned with each other, is given a priority, upon selection, higher than that which is given to the second methodology in which a peak position of a primary component of radial force variation of the tire and a bottom position of a primary component of radial runout of the wheel are aligned with each other; therefore, excessive increase in the size of an adjustment weight for correcting unevenness of weight distribution can be avoided.

In yet another aspect of the present invention, a method for assembling a tire and a wheel is provided. The method for assembling a tire and a wheel comprises the steps of: selecting a tire/wheel assembling methodology retrieved from a table based upon rigidity information of the wheel and an amount of radial runout of the wheel, wherein the table as a set of data comprises classifications which include a plurality of rigidity classifications for classifying the wheel by rigidity based upon the rigidity information and a plurality of radial runout classifications for classifying the wheel by the amount of radial runout, each of the classifications being associated with one of tire/wheel assembling methodologies which include a first methodology and a second methodology, the first methodology being a methodology in which a light point of static imbalance of the tire and a heavy point of static imbalance of the wheel are aligned with each other, the second methodology being a methodology in which a peak position of a primary component of radial force variation of the tire and a bottom position of a primary component of radial runout of the wheel are aligned with each other; and assembling the tire and the wheel together in accordance with the assembling methodology selected in the selecting step.

According to this method as well, the methodology for assembling a tire and a wheel together in a properly balance-adjustable manner can be selected simply by making use of the rigidity information of the wheel on which the tire is to be mounted, and thus the method for assembling a tire and a wheel can be executed in a simple process configuration without requiring a bigger adjustment weight.

In the method for assembling a tire and a wheel as described above, the step of selecting a tire/wheel assembling methodology may be configured to comprise selecting the first methodology in an increased likelihood as the rigidity classification of the wheel is lower, and/or may be configured to comprise selecting the first methodology in an increased likelihood as the radial runout classification is lower.

With this configuration, the first methodology, in which a light point of static imbalance of the tire and a heavy point of static imbalance of the wheel are aligned with each other, is given a priority, upon selection, higher than that which is given to the second methodology in which a peak position of a primary component of radial force variation of the tire and a bottom position of a primary component of radial runout of the wheel are aligned with each other; therefore, excessive increase in the size of an adjustment weight for correcting unevenness of weight distribution can be avoided.

In the method for assembling a tire and a wheel as described above, the rigidity information of the wheel may include a thickness of a rim of the wheel or a material of the wheel, for example. The both of the thickness and the material of the wheel can be utilized as the rigidity information. Since the rigidity information of the wheel is such information, e.g., the thickness of the rim and/or material of the wheel, as can be readily measured or acquired, the method for assembling a tire and a wheel can be executed in a simple process configuration.

In yet another aspect of the present invention, an apparatus for selecting a tire/wheel assembling methodology is provided. The apparatus for selecting a tire/wheel assembling methodology comprises: a first input unit configured to receive rigidity information of a wheel on which a tire is to be mounted; a second input unit configured to receive an amount of radial runout of the wheel on which the tire is to be mounted; a selection unit including a table stored in advance, wherein the table comprises classifications which include a plurality of rigidity classifications for classifying the wheel by rigidity based upon the rigidity information and a plurality of radial runout classifications for classifying the wheel by the amount of radial runout, each of the classifications being associated with one of tire/wheel assembling methodologies which include a first methodology and a second methodology, the first methodology being a methodology in which a light point of static imbalance of the tire and a heavy point of static imbalance of the wheel are aligned with each other, the second methodology being a methodology in which a peak position of a primary component of radial force variation of the tire and a bottom position of a primary component of radial runout of the wheel are aligned with each other, wherein the selection unit is configured to select a tire/wheel assembling methodology retrieved from the table based upon the rigidity information of the wheel received by the first input unit and the amount of radial runout of the wheel received by the second input unit; and an output unit configured to output the assembling methodology selected by the selection unit.

According to the above-recited apparatus, the methodology for assembling a tire and a wheel together can be selected by making use of the rigidity information and the amount of radial runout of the wheel on which the tire is to be mounted, and thus an apparatus for assembling a tire and a wheel can be implemented in a simple device configuration. Further, addition of some devices such as an input unit to an existing apparatus for assembling a tire and a wheel is all that is needed to provide an improved apparatus for assembling a tire and a wheel as described above; therefore, the existing equipment can be utilized effectively and the capital investment can be reduced.

The aspects and advantages as described above, other advantages and further features of the present invention will become more apparent by describing in detail illustrative, non-limiting embodiments thereof with reference to the accompanying drawings.

BRIEF DESCRIPTION OF DRAWINGS

FIG. 3 is a table showing criteria of selection of a tire/wheel assembling methodology.

FIG. 5 shows changes in the radii of rims of wheels, as exhibited when a load is applied to each wheel in a radial direction thereof, and measured for wheels made of different materials and having different rim thicknesses.

FIG. 6 shows a relationship between an amount of a primary component of radial runout of a wheel and a value of a primary component of radial force variation of the wheel, with respect to wheels made of different materials and having different rim thicknesses.

MODE(S) FOR CARRYING OUT THE INVENTION

Figure 1:
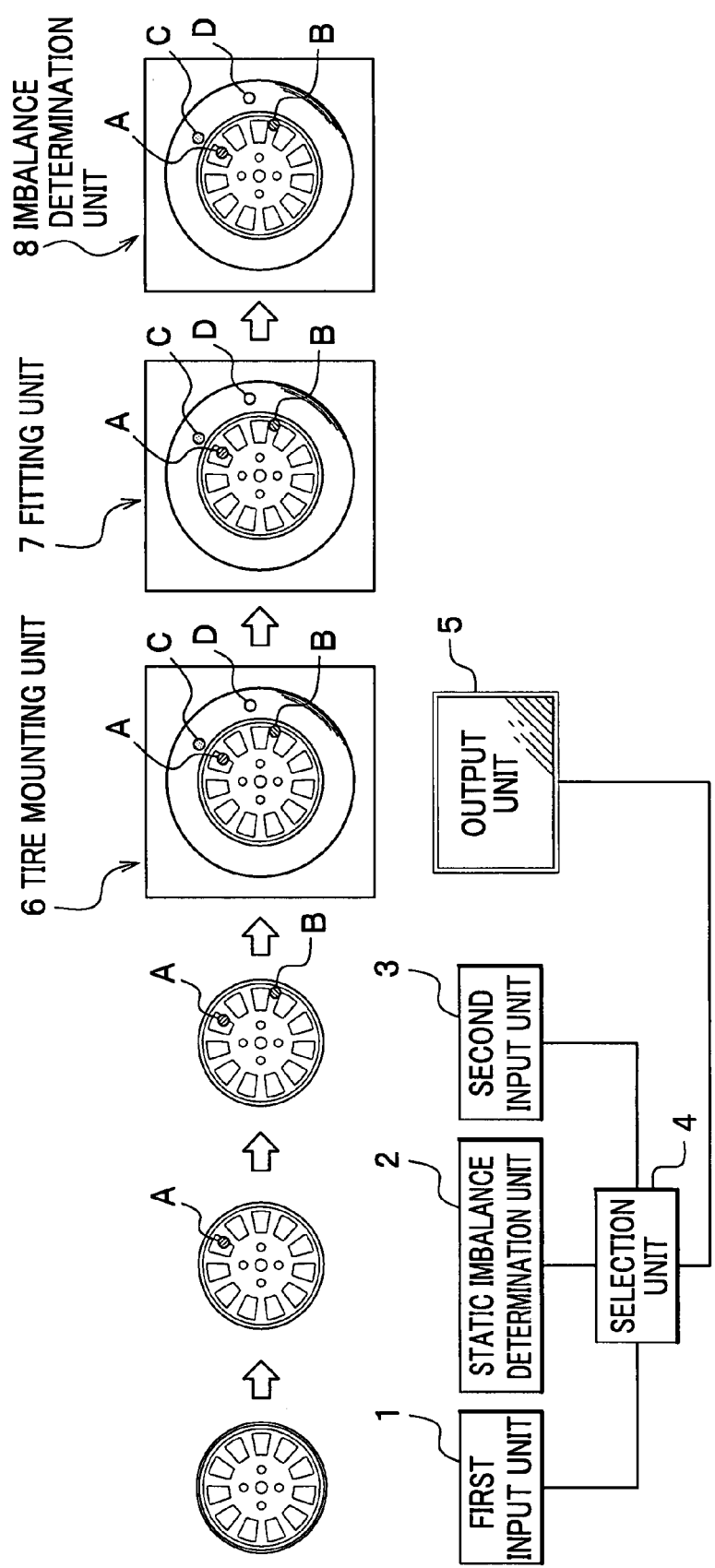
FIG. 1 is a conceptual illustration of an apparatus for assembling a tire and a wheel according to the present invention.

First of all, underlying facts based on which the present invention has been made will be described with reference to FIGS. 5 and 6. FIG. 5 illustrates changes in the radii of rims of wheels, as exhibited when a load is applied to each wheel in a radial direction thereof, and measured for the wheels made of different materials and having different rim thicknesses, i.e., an extent to which each wheel is crushed by a specific load. The materials of the wheels used in this experiment include two kinds of materials: an aluminum alloy (the wheel made of an aluminum alloy will hereinafter be called "aluminum wheel"); and iron (the wheel made of iron will hereinafter be called "iron wheel"), wherein the iron wheels include four kinds varying in the rim thickness from 2.3 mm to 3.5 mm. For the aluminum wheel, one kind having the rim thickness of 3.5 mm is used since another experiment has revealed that the percentage of the aluminum wheel crushed by a load increases in proportion to the rise in the load independent of the rim thickness. The reason why the rigidity of the aluminum wheel, unlike that of the iron wheel, is unaffected by the rim thickness is that the rigidity of the aluminum wheel is greater than that of the iron wheel.

The iron wheels of 2.3 mm and 2.6 mm in rim thickness become deformed more greatly by loads in the radial direction (making their rim thicknesses smaller) than the other wheels. This shows that the iron wheels of 2.3 mm and 2.6 mm in rim thickness are less rigid than the other wheels.

FIG. 6 shows a relationship between an amount of a primary component of radial runout of a wheel and a value of a primary component of radial force variation of the wheel, with respect to wheels made of different materials and having different rim thicknesses. In order to eliminate the influence of tire-specific radial force variation, the value of the radial force variation of each wheel was determined by: mounting a tire on a reference wheel of which an amount of radial runout is 0 mm to preliminarily determine a value of tire-specific radial force variation; then, mounting the tire on the wheel to determine a value of radial force variation of a tire/wheel assembly made up of the tire and the wheel; and subtracting the preliminarily determined value of tire-specific radial force variation from the value determined of the tire/wheel assembly. The value of a primary component of radial force variation of the wheel is a value determined by subtracting an irregular factor of radial force variation of the wheel derived from welding beads or the like from the value of radial force variation of the wheel which was determined as above.

For every wheel, the value of the primary component of radial force variation of the wheel increased accordingly as the amount of the primary component of radial runout thereof increased. For the wheels of 2.3 mm and 2.6 mm rim thicknesses, however, the degrees of increase in the values of the primary components of radial force variation of the wheels of 2.3 mm and 2.6 mm rim thicknesses were less than those of the other wheels. From this, it turned out that the increase in the primary component of radial force variation of the less rigid wheel determined thus in FIG. 5 would not have so much influence on the value of the primary component of radial force variation of the wheel. In other words, the applicant has discovered that the first components of radial force variation of the less rigid wheels can be cancelled out unless the tire and the wheel are assembled together in such a manner that the primary component of radial force variation of the tire is cancelled out by the primary component of radial runout of the wheel.

Next, some exemplary embodiments of the present invention will be described in detail with reference given to the drawings where appropriate. FIG. 1 is a conceptual illustration of an apparatus for assembling a tire and a wheel according to the present invention.

The apparatus for assembling a tire and a wheel according to the present invention includes, as shown in FIG. 1, a first input unit 1, a static imbalance determination unit 2, a second input unit 3, a selection unit 4, an output unit 5, a tire mounting unit 6, a fitting unit 7 and an imbalance determination unit 8.

The first input unit 1 is a device configured to receive rigidity information of the wheel on which the tire is to be mounted. The rigidity information of the wheel includes a material and a rim thickness of the wheel.

The static imbalance determination unit 2 is a device known in the art for determining an amount of static imbalance of the wheel on which the tire is to be mounted, and locating its position on the circumference of the wheel, to put a mark A on a heavy point of the static imbalance.

The second input unit 3 is a device configured to receive an amount of a primary component of radial runout of the wheel on which the tire is to be mounted. The second input unit 3 includes an input section and a radial runout determination device. The radial runout determination device is a device known in the art for determining an amount of a primary component of radial runout of the wheel, and locating its position on the circumference of the wheel to put a mark B on a bottom position of the primary component of radial runout.

The selection unit 4 is a device for selecting a tire/wheel assembling methodology, based upon a table that will be described later, from a first methodology in which a light point of static imbalance of the tire and a heavy point of static imbalance of the wheel are aligned with each other and a second methodology in which a peak position of a primary component of radial force variation of the tire and a bottom position of a primary component of radial runout of the wheel are aligned with each other.

The output unit 5 is a device configured to output the assembling methodology selected by the selection unit 4, and disposed near the tire mounting unit 6 that will be described below. The output unit 5 is, for example, a display having a screen on which an assembling methodology selected by the selection unit 4 is to be displayed.

The tire mounting unit 6 is a device for assembling a tire and a wheel together. The fitting unit 7 is a device for adjusting the state of assembly of the tire and the wheel. The imbalance determination unit 8 is a device for determining an amount of static imbalance and an amount of dynamic imbalance of the tire/wheel assembly and locating their positions on its circumference, to attach an adjustment weight for correcting unevenness of weight distribution on the rim of the wheel. All of these units are devices known in the art.

Figure 2:
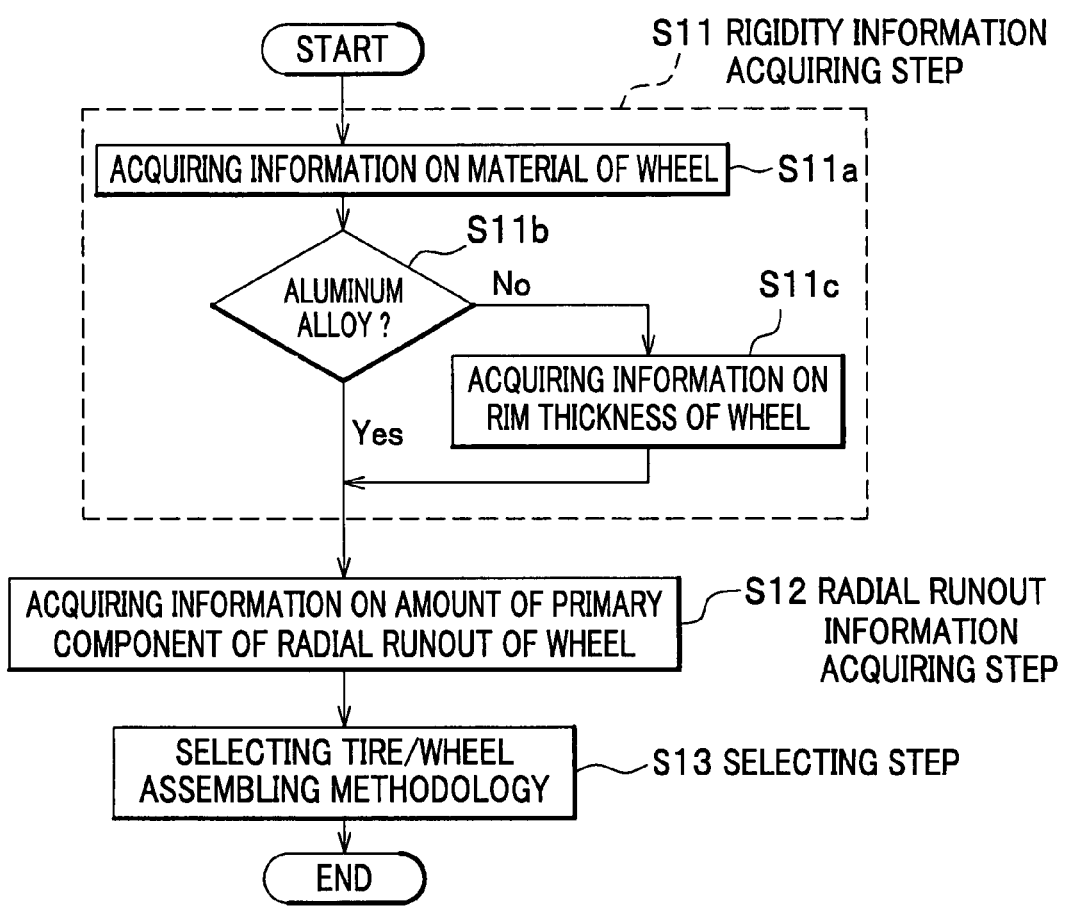
FIG. 2 is a flowchart showing process steps carried out in a selection unit.

In the apparatus for assembling a tire and a wheel, which has a construction as described above, the selection unit 4 is configured to follow process steps shown in FIG. 2 to select a tire/wheel assembling methodology. FIG. 2 is a flowchart showing the process steps carried out in a selection unit 4.

The process executed in the selection unit 4 comprises a rigidity information acquiring step S11, a radial runout information acquiring step S12 and a selecting step S13.

In the rigidity information acquiring step S11, information on a material and a rim thickness of a wheel on which a tire is to be mounted is acquired. To be more specific, information on a material of the wheel on which a tire is to be mounted is acquired (S11a) from the first input unit 1 (see FIG. 1). It is then determined (S11b) from the acquired information on the material of the wheel whether or not the material is an aluminum alloy, and if it is an aluminum alloy (Yes), then the process goes to the subsequent radial runout information acquiring step S12. On the other hand, if it is determined from the acquired information on the material of the wheel that the material is not an aluminum alloy (No), i.e., the material of the wheel is iron, then information on a thickness of a rim of the wheel is acquired (S11c), and the process goes to the subsequent radial runout information acquiring step S12.

In the radial runout information acquiring step S12, information on an amount of a primary component of radial runout of the wheel on which a tire is to be mounted is acquired from the second input unit 3 (see FIG. 1). Then, the process goes to the next selecting step S13.

In the selecting step S13, one of a first methodology and a second methodology is selected among tire/wheel assembling methodologies, from a table as a set of data (information) which will be described later, based upon information on the material and rim thickness of the wheel acquired in the rigidity information acquiring step S11, and information on the amount of the primary component of radial runout acquired in the radial runout information acquiring step S12, wherein the first methodology is a methodology in which a light point of static imbalance of the tire and a heavy point of static imbalance of the wheel are aligned with each other (hereinafter referred to as "heavy point-light point alignment"), and the second methodology is a methodology in which a peak position of a primary component of radial force variation of the tire and a bottom position of a primary component of radial runout of the wheel are aligned with each other (hereinafter referred to as "radial force variation alignment").

FIG. 3 is a table as a set of data showing criteria of selection of a tire/wheel assembling methodology. Rigidity classifications of wheels have three categories of high rigidity, middle rigidity and low rigidity, which are based upon the material and the thickness of a rim of the wheel. The thinner the rim of the wheel is, the less rigid iron wheels become; thus, the iron wheels of 3.2 mm and 3.5 mm rim thicknesses are classified into the high rigidity category, the iron wheels of 2.9 mm rim thickness are classified into the middle rigidity category, and the iron wheels of 2.3 mm and 2.6 mm rim thickness are classified into the low rigidity category. The rim thicknesses are divided in such a manner as shown in FIG. 3, because the iron wheels commonly used have the rim thicknesses of 2.3 mm, 2.6 mm, 2.9 mm, 3.2 mm and 3.5 mm. On the other hand, the rigidity of aluminum wheels is not affected by rim thicknesses, and thus the rigidity classification thereof has only one category, that is, the high rigidity category.

Radial runout classifications of wheels have three categories ranging 0 mm-0.15 mm, 0.16 mm-0.38 mm and 0.69 mm-0.5 mm, which are based upon the amount of a primary component of radial runout of the wheel.

As shown in FIG. 3, for aluminum wheels, the wheels having an amount of a primary component of radial runout ranging from 0 mm to 0.15 mm are assigned to the heavy point-light point alignment, the wheels having an amount of a primary component of radial runout ranging from 0.16 mm to 0.38 mm are assigned to the radial force variation alignment. It is to be understood that aluminum wheels having an amount of a primary component of radial runout exceeding 0.39 mm are products to be rejected.

On the other hand, for high-rigidity iron wheels, the wheels having an amount of a primary component of radial runout ranging from 0 mm to 0.15 mm are assigned to the heavy point-light point alignment, and the wheels having an amount of a primary component of radial runout ranging from 0.16 mm to 0.38 mm and from 0.39 mm to 0.5 mm are assigned to the radial force variation alignment. It is to be understood that iron wheels having an amount of a primary component of radial runout exceeding 0.5 mm are products to be rejected.

Similarly, for middle-rigidity iron wheels, the wheels having a value of a primary component of radial runout ranging from 0 mm to 0.15 mm and from 0.16 mm to 0.38 mm are assigned to the heavy point-light point assignment, and the wheels having an amount of a primary component of radial runout ranging from 0.39 mm to 0.5 mm are assigned to the radial force variation alignment.

Further, for low-rigidity iron wheels, all the wheels having a value of a primary component of radial runout in an entire range of radial runout classifications from 0 mm to 0.5 mm are assigned to the heavy point-light point alignment.

Hereafter, the grounds for the correspondence, established as shown in FIG. 3, of the tire/wheel assembling methodologies to the rigidity classifications of the wheels and the radial runout classifications of the wheels will be brought up for discussion. First, the underlying factor based on which the correspondence is established lies in the known fact that the value of radial force variation of the tire/wheel assembly exceeding 98.1N (10 kgf) would render the vibration of a vehicle body too strong to impair the riding comfort. With this in view, when a tire and a wheel are assembled together, the assembling methodology should be determined such that the value of radial force variation of the tire/wheel assembly is 98.1 N (10 kgf) or less.

In order to predetermine the assembling methodologies as shown in FIG. 3, the wheels having different amounts of the primary component of radial runout for each rigidity classification of the wheels were subjected to determination, in which a tire was mounted on the respective wheels with adjustments made to the heavy point-light point alignment and the radial force variation alignment respectively to make tire/wheel assemblies, of which the values of radial force variation were determined. It was shown from the results of determination that when a tire was mounted on an aluminum wheel with adjustments made to the heavy point-light point alignment, the tire/wheel assemblies made with the wheels of which the amounts of primary components of radial runout were in the range from 0 mm to 0.15 mm exhibited a value of radial force variation of 98.1N (10 kgf) or less. In contrast, if the amounts of primary components of radial runout exceeded 0.16 mm, the value of radial force variation of each of the resulting tire/wheel assemblies exceeded 98.1N (10 kgf). On the other hand, when a tire was mounted on an aluminum wheel with adjustments made to the radial force variation alignment, the tire/wheel assemblies made with the wheels of which the amounts of primary components of radial runout were in the entire range from 0 mm to 0.38 mm exhibited a value of radial force variation of 98.1N (10 kgf) or less.

Determination as above was made for all of the wheels each classified in the rigidity classifications. Then, if the value of radial force variation of a tire/wheel assembly was not more than 98.1N (10 kgf), the heavy point-light point alignment was given a priority, upon selection, higher than the radial force variation alignment. The determination results are shown in FIG. 3, in which the lower the radial runout classification of the wheel is, the more likely the heavy point-light point alignment is selected. In this way, since the heavy point-light point alignment is given a priority, upon selection, higher than the radial force variation alignment, excessive increase in the size of an adjustment weight for correcting unevenness of weight distribution can be avoided.

From the findings as shown in FIGS. 5 and 6, it turned out that the wheel of lower rigidity is capable of cancelling out a primary component of radial force variation of the wheel. Therefore, it is determined as shown in FIG. 3 that the lower the rigidity classification of the wheel is, the more likely the heavy point-light point alignment is selected. Accordingly, since the heavy point-light point alignment is given a priority, upon selection, higher than the radial force variation alignment, excessive increase in the size of an adjustment weight for correcting unevenness of weight distribution can be avoided.

Figure 4:
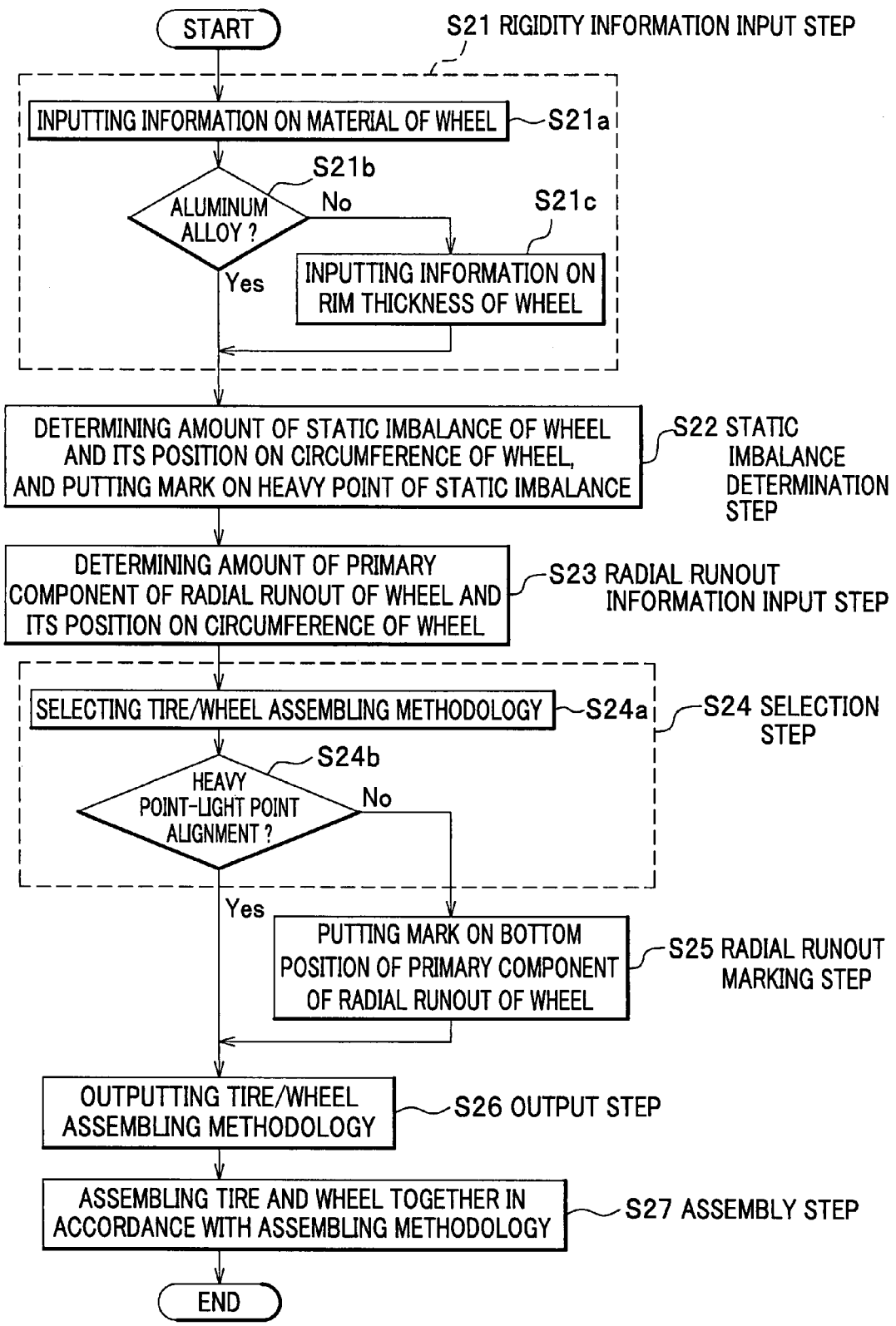
FIG. 4 is a flowchart of a method for assembling a tire and a wheel according to the present invention.

FIG. 4 is a flowchart of a method for assembling a tire and a wheel according to the present invention. The method for assembling a tire and a wheel according to the present invention comprises, as shown in FIG. 4, a rigidity information input step S21, a static imbalance determination step S22, a radial runout information input step S23, a selection step S24, a radial runout marking step S25, an output step S26 and an assembly step S27.

In the rigidity information input step S21, information is received on a material and a rim thickness of a wheel on which a tire is to be mounted. To be more specific, information on the material of the wheel on which a tire is to be mounted is input through a first input unit 1 (see FIG. 1) (S21a). Then, it is determined whether or not the received information indicates that the material of the wheel is an aluminum alloy (S21b), if it is an aluminum alloy (Yes), the process goes to the next static imbalance determination step S22. On the other hand, if the material of the wheel is not an aluminum alloy (No), i.e., the material of the wheel is iron, information on a thickness of the wheel is input through the first input unit 1 (S21c). In response to the input of the information of the rim thickness of the wheel, the process goes to the next static imbalance determination step S22.

In the static imbalance determination step S22, an amount of static imbalance of the wheel on which the tire is to be mounted, and its position on the circumference of the wheel, are determined. Then, as shown in FIG. 1, a mark A is put on a heavy point of the static imbalance.

In the radial runout information input step S23, an amount of a primary component of radial runout of the wheel on which a tire is to be mounted, and its position on the circumference of the wheel, are determined. Thus determined amount of a primary component of radial runout is input through the second input unit 3 (see FIG. 1).

In the selection step S24, based upon a table as shown in FIG. 3, the rigidity classification of the wheel is identified by the information on the material and the rim thickness of the wheel, which was input in the rigidity information input step S21. On the other hand, the radial runout classification of the wheel is identified by the information on the amount of a primary component of radial runout of the wheel, which was input in the radial runout information input step S23. Then, one of the tire/wheel assembling methodologies, the heavy point-light point alignment or the radial force variation alignment, is selected based upon the identified rigidity classification of the wheel and the identified radial runout classification of the wheel (S24a).

Then, it is determined (S24b) whether or not the selected tire/wheel assembling methodology is the heavy point-light point alignment, if it is the heavy point-light point alignment (Yes), the process goes to the later output step S26. On the other hand, if the selected tire/wheel assembling methodology is not the heavy point-light point alignment (No), i.e., the selected tire/wheel assembling methodology is the radial force variation alignment, the process goes to the radial runout marking step S25. In the radial runout marking step S25, a mark B is put on a bottom position of a primary component of radial runout of the wheel as shown in FIG. 1, based upon the determination result in the radial runout information input step S23, and then, the process proceeds to a next process step S26.

In the output step S26, the assembling methodology selected in the selection step S24 is output, so that the tire and the wheel are assembled together in accordance with the assembling methodology in the next assembly step S27. To be more specific, if the heavy point-light point alignment is selected, the tire and the wheel are assembled together with adjustments made to alignment of mark C (see FIG. 1), which indicates a light point of static imbalance of the tire, with mark A (see FIG. 1), which indicates a heavy point of static imbalance of the wheel put in the static imbalance determination step S22. On the other hand, if the radial force variation alignment is selected, the tire and the wheel are assembled together with adjustments made to alignment of mark D (see FIG. 1), which indicates a peak position of a primary component of radial force variation of the tire, with mark B (see FIG. 1) put in the radial runout marking step S25, which indicates a bottom position of a primary component of radial runout of the wheel. It is generally understood that the mark C indicating the light point of static imbalance of the tire and the mark D indicating the peak position of the primary component of the radial force variation of the tire have been put during a manufacturing process of the tire.

Although the above-exemplified method of assembling a tire and a wheel according to the present invention has been explained on the premise that the selection step S24 thereof is implemented on a computer, the selection in step S24 may be made by a human. In the human selecting implementation, one can consult the table as shown in FIG. 3, to identify the rigidity classification of the wheel from the material and the rim thickness of the wheel, and the radial runout classification of the wheel from the amount of a primary component of radial runout of the wheel, so that the optimum assembling methodology can be selected.

Although exemplary embodiments of the present invention have been described above, the present invention is not limited to the above-illustrated embodiments. For example, the above embodiments fail to comprise a step of determining an amount of static imbalance of a tire and locating its position on the circumference of the tire, but may comprise such a determination step. In cases where the wheel of which the amount of a primary component of radial runout and its position on the circumference of the wheel have been determined beforehand is used, the relevant step S23 may be omitted. Further, the rim thickness as a criterion of determination of rigidity classifications of the wheel may be changed according as the rigidity of wheels would be enhanced in comparison with the existing wheels as a result of improvement of the materials or manufacturing methods of the wheels.

The invention claimed is:

1. An apparatus for assembling a tire and a wheel, comprising:
  a first input unit configured to receive rigidity information of the wheel on which the tire is to be mounted;
  a second input unit configured to receive an amount of radial runout of the wheel on which the tire is to be mounted;
  a selection unit including a table stored in advance, wherein the table comprises classifications which include a plurality of rigidity classifications for classifying the wheel by rigidity based upon the rigidity information and a plurality of radial runout classifications for classifying the wheel by the amount of radial runout, each of the classifications being associated with one of tire/wheel assembling methodologies which include a first methodology and a second methodology, the first methodology being a methodology in which a light point of static imbalance of the tire and a heavy point of static imbalance of the wheel are aligned with each other, the second methodology being a methodology in which a peak position of a primary component of radial force variation of the tire and a bottom position of a primary component of radial runout of the wheel are aligned with each other, wherein the selection unit is configured to select a tire/wheel assembling methodology retrieved from the table based upon the rigidity information of the wheel received by the first input unit and the amount of radial runout of the wheel received by the second input unit; and
  an output unit configured to output the assembling methodology selected by the selection unit,
  wherein the tire and the wheel are assembled together in accordance with the output assembling methodology.

2. An apparatus for assembling a tire and a wheel according to claim 1, wherein the lower the rigidity classification is, the more likely the first methodology is selected by the selection unit.

3. An apparatus for assembling a tire and a wheel according to claim 1, wherein the lower the radial runout classification is, the more likely the first methodology is selected by the selection unit.

4. An apparatus for assembling a tire and a wheel according to claim 1, wherein the rigidity information of the wheel includes a thickness of a rim of the wheel.

5. An apparatus for assembling a tire and a wheel according to claim 4, wherein the rigidity information of the wheel includes a material of the wheel.

6. An apparatus for assembling a tire and a wheel according to claim 1, wherein the rigidity information of the wheel includes a material of the wheel.

7. A method for assembling a tire and a wheel, comprising the steps of:
  selecting one of a first methodology and a second methodology among tire/wheel assembling methodologies on the basis of rigidity information of the wheel and an amount of radial runout of the wheel, the first methodology being a methodology in which a light point of static imbalance of the tire and a heavy point of static imbalance of the wheel are aligned with each other, the second methodology being a methodology in which a peak position of a primary component of radial force variation of the tire and a bottom position of a primary component of radial runout of the wheel are aligned with each other; and assembling the tire and the wheel together in accordance with the selected assembling methodology.

8. A method for assembling a tire and a wheel according to claim 7, wherein the selecting step comprises selecting the first methodology in an increased likelihood as the rigidity of the wheel determined on the basis of the rigidity information of the wheel is lower.

9. A method for assembling a tire and a wheel according to claim 8, wherein the rigidity information of the wheel includes a thickness of a rim of the wheel.

10. A method for assembling a tire and a wheel according to claim 8, wherein the rigidity information of the wheel includes a material of the wheel.

11. A method for assembling a tire and a wheel according to claim 7, wherein the selecting step comprises selecting the first methodology in an increased likelihood as the amount of radial runout is smaller.

12. A method for assembling a tire and a wheel according to claim 7, wherein the rigidity information of the wheel includes a thickness of a rim of the wheel.

13. A method for assembling a tire and a wheel according to claim 7, wherein the rigidity information of the wheel includes a material of the wheel.

14. A method for assembling a tire and a wheel according to claim 7, wherein the rigidity information of the wheel includes a thickness of a rim of the wheel and a material of the wheel.

15. A method for assembling a tire and a wheel comprising the steps of:

selecting a tire/wheel assembling methodology retrieved from a table based upon rigidity information of the wheel and an amount of radial runout of the wheel, wherein the table comprises classifications which include a plurality of rigidity classifications for classifying the wheel by rigidity based upon the rigidity information and a plurality of radial runout classifications for classifying the wheel by the amount of radial runout, each of the classifications being associated with one of tire/wheel assembling methodologies which include a first methodology and a second methodology, the first methodology being a methodology in which a light point of static imbalance of the tire and a heavy point of static imbalance of the wheel are aligned with each other, the second methodology being a methodology in which a peak position of a primary component of radial force variation of the tire and a bottom position of a primary component of radial runout of the wheel are aligned with each other; and assembling the tire and the wheel together in accordance with the assembling methodology selected in the selecting step.

16. A method for assembling a tire and a wheel according to claim 15, wherein the selecting step comprises selecting the first methodology in an increased likelihood as the rigidity classification is lower.

17. A method for assembling a tire and a wheel according to claim 15, wherein the selecting step comprises selecting the first methodology in an increased likelihood as the radial runout classification is lower.

18. A method for assembling a tire and a wheel according to claim 15, wherein the rigidity information of the wheel includes a thickness of a rim of the wheel.

19. A method for assembling a tire and a wheel according to claim 15, wherein the rigidity information of the wheel includes a material of the wheel.

20. An apparatus for selecting a tire/wheel assembling methodology, comprising:

a first input unit configured to receive rigidity information of a wheel on which a tire is to be mounted;

a second input unit configured to receive an amount of radial runout of the wheel on which the tire is to be mounted;

a selection unit including a table stored in advance, wherein the table comprises classifications which include a plurality of rigidity classifications for classifying the wheel by rigidity based upon the rigidity information and a plurality of radial runout classifications for classifying the wheel by the amount of radial runout, each of the classifications being associated with one of tire/wheel assembling methodologies which include a first methodology and a second methodology, the first methodology being a methodology in which a light point of static imbalance of the tire and a heavy point of static imbalance of the wheel are aligned with each other, the second methodology being a methodology in which a peak position of a primary component of radial force variation of the tire and a bottom position of a primary component of radial runout of the wheel are aligned with each other, wherein the selection unit is configured to select a tire/wheel assembling methodology retrieved from the table based upon the rigidity information of the wheel received by the first input unit and the amount of radial runout of the wheel received by the second input unit; and an output unit configured to output the assembling methodology selected by the selection unit.

* * * * *